United States Patent
Kobayashi

(10) Patent No.: US 7,093,131 B1
(45) Date of Patent: Aug. 15, 2006

(54) INFORMATION AUTHENTICATING APPARATUS AND AUTHENTICATING STATION

(75) Inventor: Michio Kobayashi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 869 days.

(21) Appl. No.: 09/676,347

(22) Filed: Sep. 29, 2000

(51) Int. Cl.
  *H04L 9/00* (2006.01)
  *H04K 1/00* (2006.01)
(52) U.S. Cl. .................. 713/176; 380/258
(58) Field of Classification Search ........ 380/258; 713/178, 176
  See application file for complete search history.

(56) References Cited

U.S. PATENT DOCUMENTS

| | | | |
|---|---|---|---|
| 6,269,446 B1 * | 7/2001 | Schumacher et al. ....... | 713/176 |
| 2002/0059231 A1 * | 5/2002 | Kuwano et al. ............. | 707/7 |

FOREIGN PATENT DOCUMENTS

| JP | 09-200730 | 7/1997 |
|---|---|---|
| JP | 10-105057 | 4/1998 |
| JP | 10-164549 | 6/1998 |
| JP | 11-215452 | 8/1999 |
| JP | 11-220686 | 8/1999 |
| JP | 11-231776 | 8/1999 |
| JP | 11-261550 | 9/1999 |
| JP | 11-308564 | 11/1999 |
| JP | 2000-152148 | 5/2000 |
| JP | 2000-215379 | 8/2000 |

* cited by examiner

*Primary Examiner*—Gilberto Barrón, Jr.
*Assistant Examiner*—G. Gurshman
(74) *Attorney, Agent, or Firm*—Hogan & Hartson, LLP

(57) ABSTRACT

The present invention provides an information authenticating apparatus and an authenticating station adapted to improve the probative value of data as evidence by ensuring a high objectivity of the data. The information authenticating apparatus comprises a digital camera and an authenticating information adding section which adds authenticating information to digital data entered by the digital camera. The authenticating station comprises, on the other hand, a communication unit which receives the digital data from the information authenticating apparatus, and a digital signature affixing section. The digital signature affixing section affixes the digital signature to the digital data received by the communication unit when authenticating that the digital data have been entered by the digital camera.

23 Claims, 5 Drawing Sheets

[FIG.1]
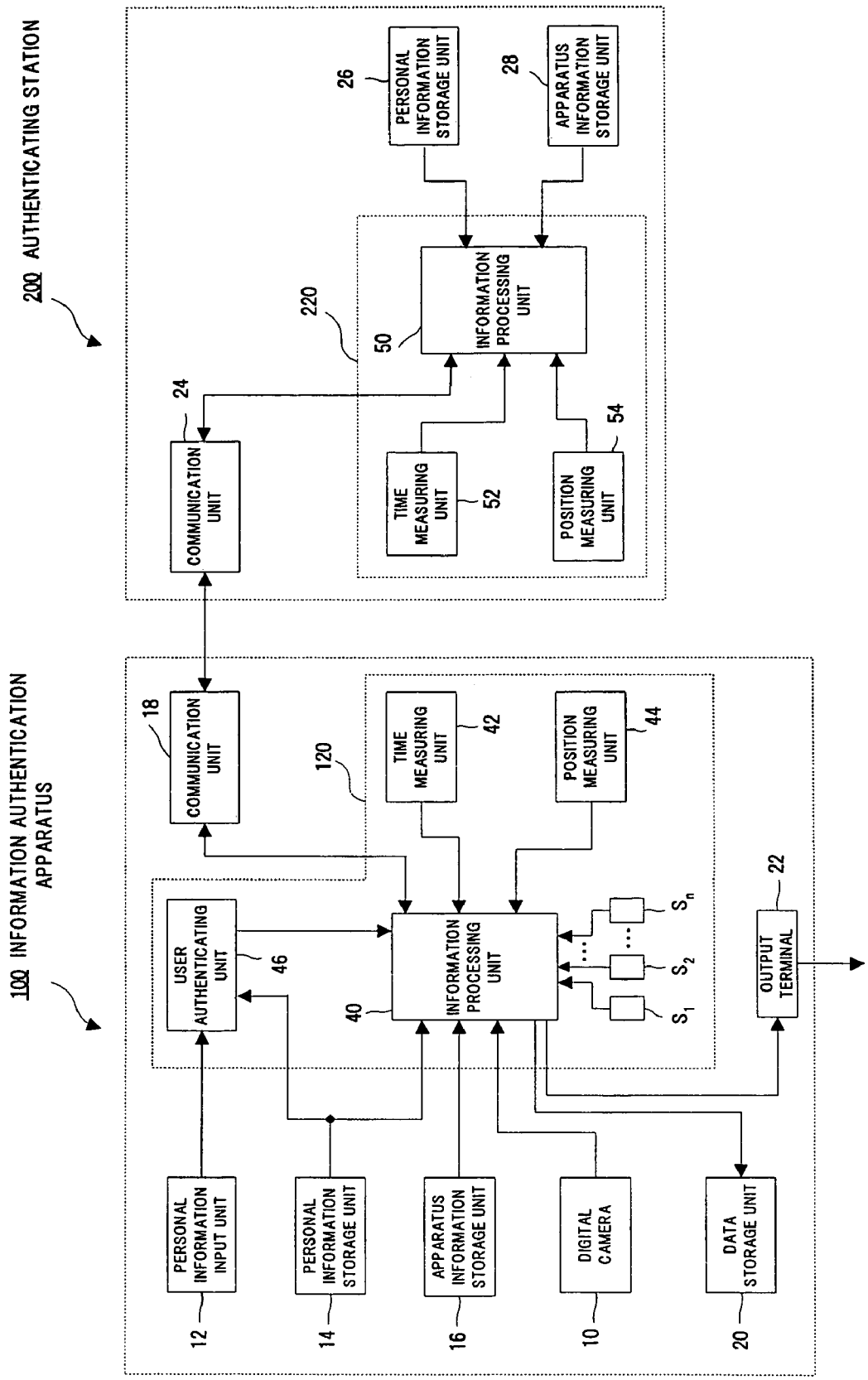

[FIG. 2]
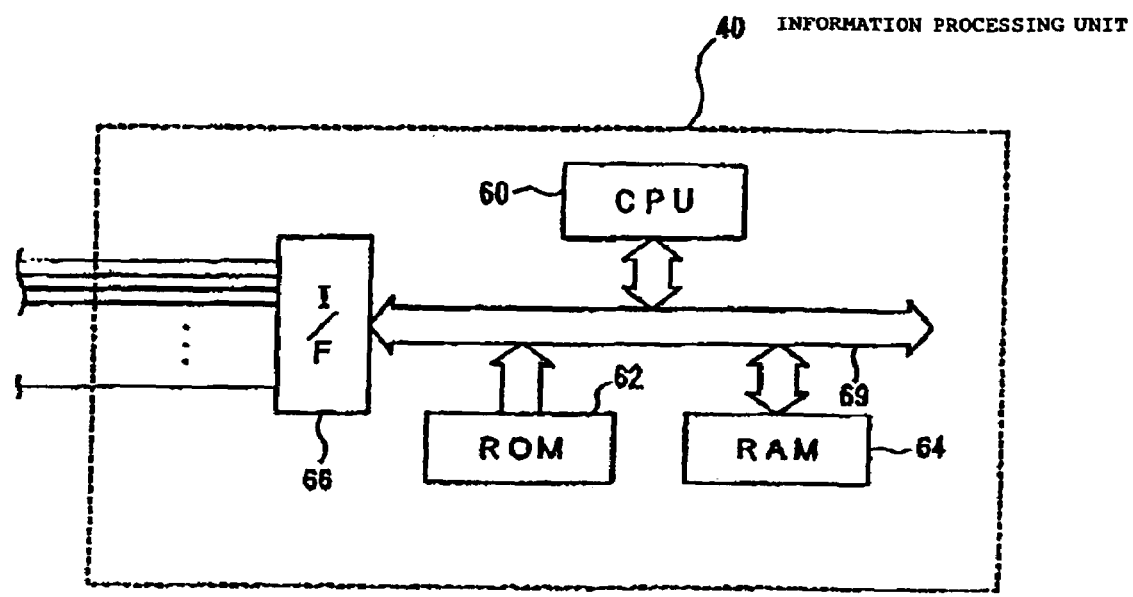

[FIG.3]
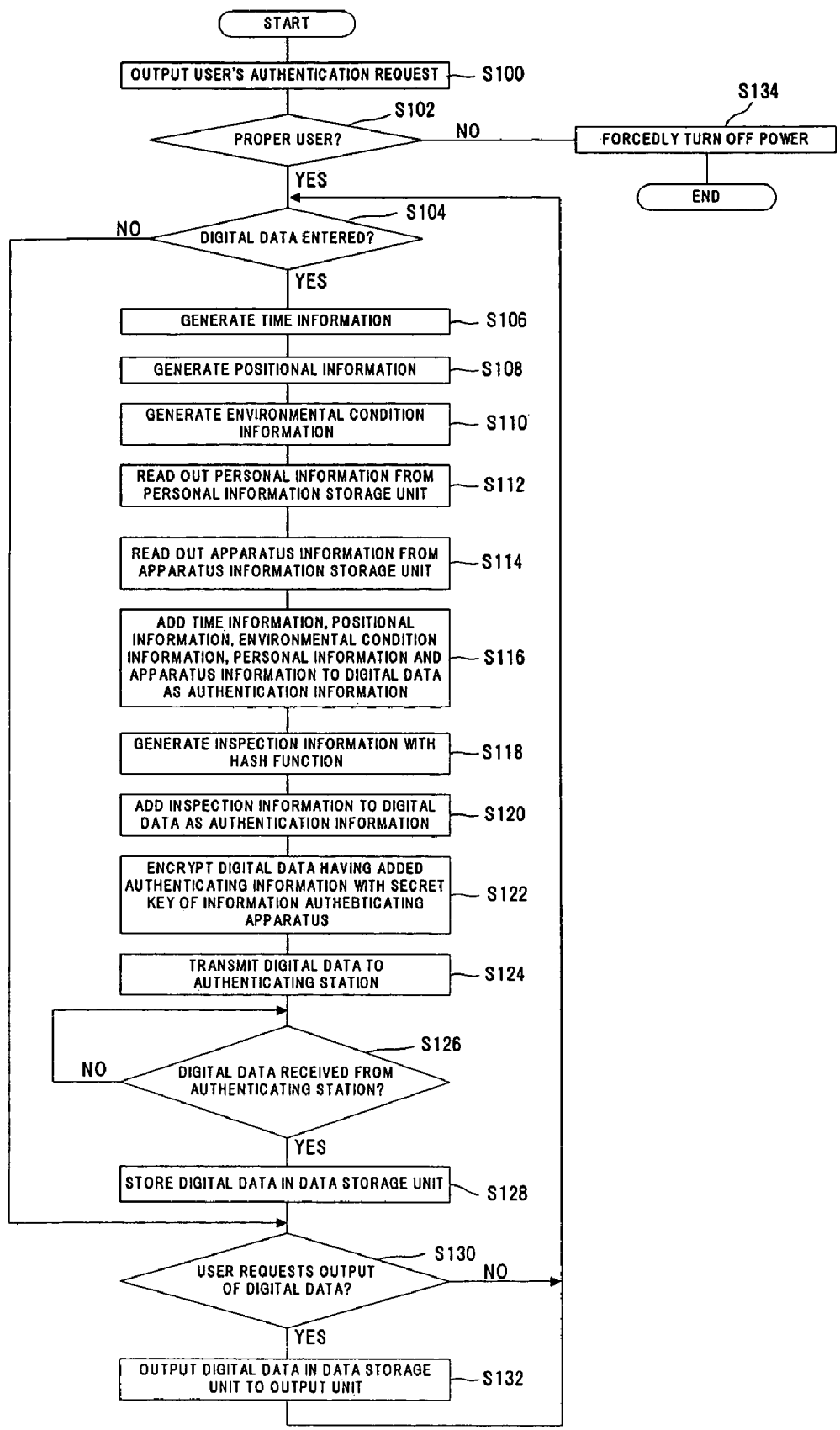

[FIG. 4]
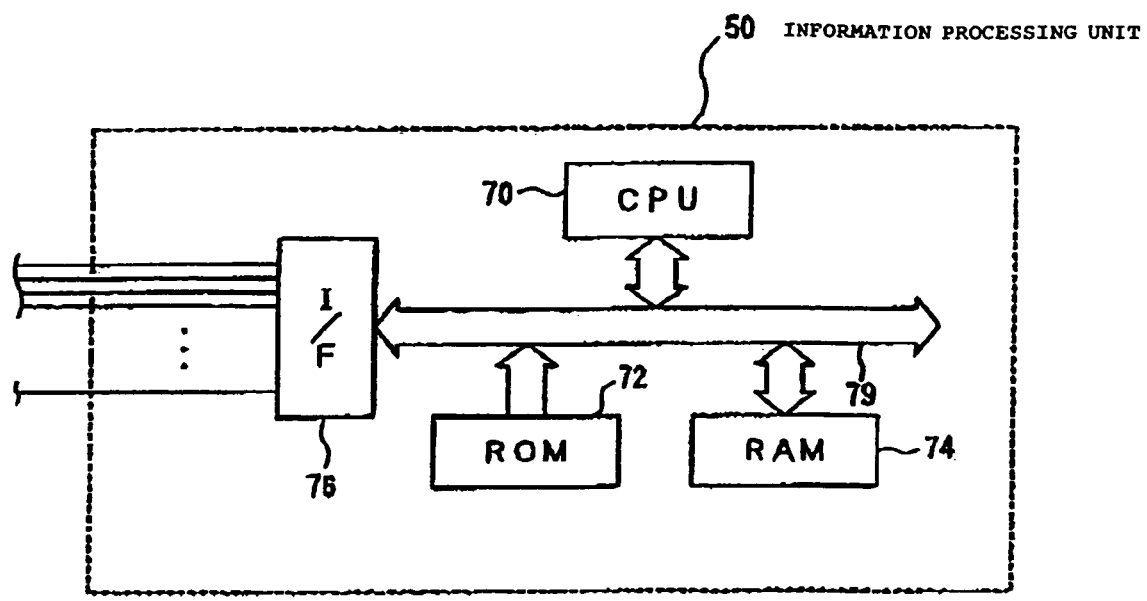

[FIG.5]
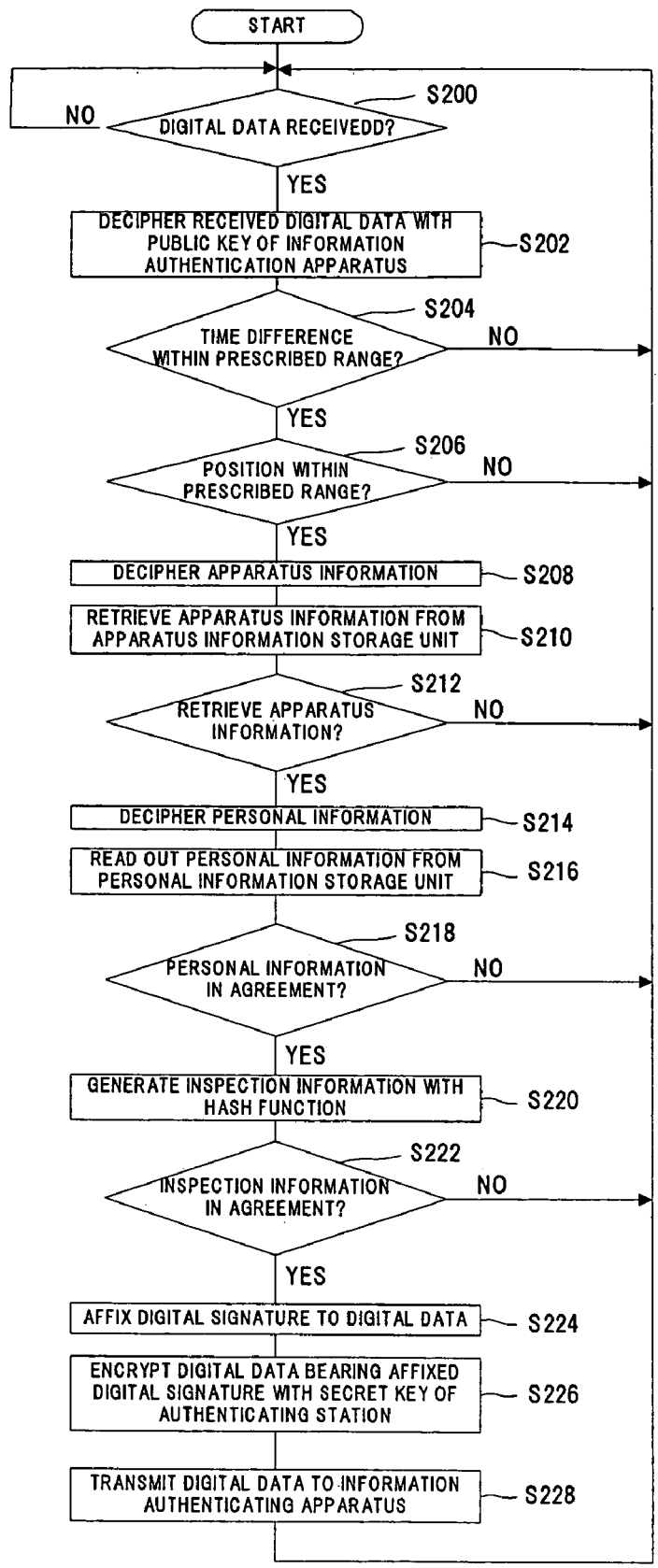

INFORMATION AUTHENTICATING APPARATUS AND AUTHENTICATING STATION

BACKGROUND OF THE INVENTION

1. Field of the Invention

This invention relates to an information authenticating apparatus and an authenticating station performing authentication of data, and to an information authenticating apparatus and an authenticating station adapted to improve probative value of data as evidence by ensuring the objectivity of the data in particular.

2. Description of the Related Art

Recently in the United States, not only photographs taken with usual cameras, but also digital images taken with digital cameras are becoming accepted as evidence in law suits. However, digital data such as digital images, which are relatively easily susceptible to alteration in general, has a problem of insufficient probative value as evidence.

For example, a vehicle control event data authenticating apparatus disclosed in Japanese Unexamined Patent Application Publication No. 11-115831 is conventionally known as an apparatus relating to a technique of improving the probative value of digital data as evidence.

The aforementioned apparatus records control events such as a series of driving operations performed by a driver before, during, and after the occurrence of a car accident, and comprises a micro-controller which is connected to receive control event information and which provides first information by adding a first time stamp and a vehicle identification number VIN to the control event information and outputs the first information to a memory according to a time overlapping method; a memory which is connected to the micro-controller and a microprocessor, and which stores the first information and second information according to the time overlapping method; and the microprocessor, which is connected to the memory and a plurality of transducers, determines whether or not received collision data are different from past collision data, and when different, generates the second information in addition to the collision data for which a second time stamp and a VIN have been received.

In the aforementioned conventional vehicle control event data authenticating apparatus, however, a time stamp is generated on the basis of a value acquired from an internal timer and added to control event information. The internal timer value may be altered by the user or suffer from deviations caused by, for example, secular deterioration, thus causing a problem in that the control event information has insufficient probative value as evidence.

For the control event information recorded by the micro-controller, a "signature" is added by the micro-controller. That is, the time stamp and a prescribed identification value are contained so as to ensure that the recorded control event information has been generated during maneuvers of a particular vehicle. This "signature", independently generated and added, has poor objectivity and also has insufficient probative value as evidence.

Because a personal ID or a vehicle identification number VIN is stored in the memory as is, it may be altered by the user, thus resulting in insufficient probative value as evidence.

In addition to law suits, on the other hand, the following cases conceivably require improvement of probative value as evidence of data.

When carrying out an examination in a hospital, for example, it is conceivable to record data proving when, where, and who has been examined. Since such data are important for a patient, it is hoped that the data are never altered by anyone, and are objective. In this case, therefore, it is necessary to improve the probative value as evidence of the data.

When delivering a parcel via door-to-door delivery service, for example, it is conceivable to record data proving when and by whom the parcel has been delivered and via what route, and such data are necessary when the parcel is lost or damaged in the course of delivery. The data should therefore be free from alteration and have objectivity. In this case, therefore, it is necessary to improve the probative value of data as evidence.

Other cases include evidencing the photographer, date or place when taking photographs of an accident site or exclusive photographs of people in show business, recording survey data in an academic survey, specifying details of a purchase order with an orderer when entering the order for a product or a service via telephone or facsimile, and proving the date of copyright when composing a piece of music.

SUMMARY OF THE INVENTION

Accordingly, the present invention is directed to an information authenticating apparatus and an authenticating station performing authentication of data that substantially obviates one or more of the problems due to limitations and disadvantages of the related art.

An object of the present invention is to provide an information authenticating apparatus and an authenticating station adapted to improve the probative value of data as evidence by ensuring the objectivity of the data.

Another object of the present invention is to provide an information authenticating apparatus and an authenticating station, wherein the authenticating information added to the data has a high objectivity. It is therefore possible to ensure objectivity of the data as compared with the conventional art, and to improve the probative value of the data as evidence.

Yet another object of the present invention is to provide an information authenticating apparatus and an authenticating station, wherein it is possible to specify a point in time when the data are entered from the authenticating information added to the data. Since the authenticating information has a high objectivity, the advantage of further improving the probative value of the data as evidence is obtained.

Yet another object of the present invention is to provide an information authenticating apparatus and an authenticating station, wherein it is possible to specify a point where the data are entered from the authenticating information added to the data. Since the authenticating 20' information has a high objectivity, the advantage of further improving the probative value of the data as evidence is obtained.

Yet another object of the present invention is to provide an information authenticating apparatus and an authenticating station, wherein it is possible to specify the environmental conditions at the point in time of input of the data from the authenticating information added to the data. Since the authenticating information has a high objectivity, the advantage of further improving the probative value of the data as evidence is obtained.

Yet another object of the present invention is to provide an information authenticating apparatus and an authenticating station, wherein it is possible to specify the user who entered the data from the authenticating information added to the data. Since the authenticating information has a high objectivity, the advantage of further improving the probative value of the data as evidence is obtained.

Yet another object of the present invention is to provide an information authenticating apparatus and an authenticating station, wherein it is possible to specify the unit with which the data was entered from the authenticating information added to the data. Since the authenticating information has a high objectivity, the advantage of further improving the probative value of the data as evidence is obtained.

Yet another object of the present invention is to provide an information authenticating apparatus and an authenticating station, wherein it is possible to know whether or not the data have been altered from the authenticating information added to the data. Since the authenticating information has a high objectivity, the advantage of further improving the probative value of the data as evidence is obtained.

Yet another object of the present invention is to provide an information authenticating apparatus and an authenticating station, wherein the received data in the authenticating station can be deciphered only by the use of the public key of the information authenticating apparatus which is the transmitting source of the data. When the data can be deciphered, it is known that the data entered by the information authenticating apparatus were really transmitted from that information authenticating apparatus. If the data cannot be deciphered, it is known that the data were not entered from that information authenticating apparatus. Therefore the advantage of further improving the probative value of the data as evidence is obtained.

Yet another object of the present invention is to provide an information authenticating apparatus and an authenticating station, wherein a digital signature is not affixed to the data when the authenticating information added to the data is altered or the data are unduly transmitted. It is therefore possible to ensure a higher objectivity of the data as compared with the conventional art, and the advantage of further improving the probative value of the data as evidence is obtained.

Yet another object of the present invention is to provide an information authenticating apparatus and an authenticating station, wherein a digital signature is not affixed when the time information added as authenticating information to the data is altered, thus enabling a higher objectivity of the data to be ensured, and the advantage of further improving the probative value of the data as evidence is obtained.

Yet another object of the present invention is to provide an information authenticating apparatus and an authenticating station, wherein a digital signature is not affixed to the data when the positional information added as authenticating information to the data is altered, thus enabling a higher objectivity of the data to be ensured, and the advantage of further improving the probative value of the data as evidence is obtained.

Yet another object of the present invention is to provide an information authenticating apparatus and an authenticating station, wherein a digital signature is not affixed to the data when the apparatus information added as authenticating information to the data are altered, thus ensuring a higher objectivity, and the advantage of further improving the probative value of the data as evidence is obtained.

Yet another object of the present invention is to provide an information authenticating apparatus and an authenticating station, wherein a digital signature is not affixed to the data when the inspection information added as authenticating information to the data or the data themselves are altered, thus ensuring a higher objectivity of the data, and the advantage of further improving the probative value of the data as evidence is obtained.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an embodiment of the present invention provides an information authenticating apparatus performing authentication of data comprising data input means for entering data and authenticating information adding means for generating information authenticating that the data have been entered by the use of the data input means on the basis of information acquired from outside and adding the generated information to the entered data.

In this configuration, when data are entered by the data input means, information is acquired from outside by the authenticating information adding means, and authenticating information is generated on the basis of the thus acquired information. The generated authenticating information is added to the data entered by the data input means. The term data used here includes all data usable on an information processing apparatus such as a computer including, for example, image data, audio and music data, document data, and waveform data.

Any authenticating information adding means is applicable as long as authenticating information can be generated on the basis of the information acquired from outside. The authenticating information adding means may receive a time signal from an orbiting satellite which transmits time signals indicating the current time, and generate time information for specifying a point in time when data are entered by the data input means as authenticating information, or may receive time signals from a plurality of orbiting satellites and generate time information for specifying a point where data are entered by the data input means as authenticating information on the basis of shifts in time shown by these time signals and the orbits of the individual satellites. When generating time information as described above, time signals may be received from a radio clock (transmitted by the Ministry of Posts and Telecommunications).

Another embodiment of the invention provides an information authenticating apparatus, wherein the authenticating information adding means generates positional information for specifying a point where the data have been entered with the data input means on the basis of the position measured by position measuring means, and adds the generated positional information as authenticating information.

In this configuration, a position is measured by the position measuring means by the use of an external information transmitting means, and positional information is generated on the basis of the position measured by the position measuring means via the authenticating information adding means. The thus generated positional information is added as authenticating information. Applicable external information transmitting means include a PHS (personal handphone system), a GSM (global system for mobile communication), a cellular phone based on IMT-2000, and a GPS (global positioning system).

Yet another embodiment of the invention provides an information authenticating apparatus authenticating data by the use of an authenticating station which performs digital signing, comprising data input means for entering data, authenticating information adding means for adding authenticating information for authenticating input of the data by the use of the data input means to the data entered by the data input means, and transmitting means for transmitting the data containing the authenticating information by the authenticating information adding means to the authenticating station.

In this configuration, when data are entered by the data input means, authenticating information is added by the authenticating information adding means to the data entered by the data input means, and the data containing the authenticating information added thereto by the authenticating information adding means are transmitted to the authenticating station. The digital signature is affixed by the authenticating station to the data transmitted from the information authenticating apparatus.

The information authenticating apparatus may perform any operation after transmitting the data to the authenticating station. For example, it may receive the data bearing the digital signature affixed thereto from the authenticating station, and store the received data, it may cause the authenticating station to hold the data having the digital signature affixed thereto, or it may transmit the data having the digital signature affixed thereto to other terminals via the authenticating station.

Yet another embodiment of the invention provides an information authenticating apparatus, wherein the authenticating information adding means has time measuring means for measuring time, generates time information for specifying a point in time when the data were entered by the data input means on the basis of the time measured by the time measuring means, and adds the generated time information as authenticating information.

In this configuration, the time is measured by the time measuring means, and the time information is generated by the authenticating information adding means on the basis of the time measured by the time measuring means. The generated time information is added as authenticating information.

Any time measuring means may be used as long as it permits measurement of time. For example, it may measure the time lapse from a reference time, or it may measure the current time. It may also measure time by means of information acquired from outside by the use, for example, of an orbiting satellite, or it may measure time by means of internally generated information by incorporating a clock timer.

Yet another embodiment of the invention provides an information authenticating apparatus, wherein the authenticating information adding means has position measuring means for measuring a position, generates positional information for specifying a point where the data were entered by the data input means on the basis of the position measured by the position measuring means, and adds the generated positional information as authenticating information.

In this configuration, the position is measured by the position measuring means, and the positional information is generated by the authenticating information adding means on the basis of the position measured by the position measuring means. The generated positional information is added as authenticating information.

Any position measuring means may be used as long as it permits measurement of position. For example, it may measure position by means of information acquired from outside by the use, for example, of a GPS, or it may measure position from internally generated information through utilization of a gyro and an accelerometer.

Yet another embodiment of the invention provides an information authenticating apparatus, wherein the authenticating information adding means has environmental condition measuring means for measuring the surrounding environmental conditions, generates environmental condition information for specifying the environmental conditions at the point in time when the data were entered by the data input means on the basis of the environmental conditions measured by the environmental condition measuring means, and adds the generated environmental condition information as authenticating information.

In this configuration, the surrounding environmental conditions are measured by the environmental condition measuring means, and the environmental condition information is generated on the basis of the environmental conditions measured by the environmental condition measuring means. The thus generated environmental condition information is added as authenticating information. Any environmental condition measuring means is applicable as long as it can measure the surrounding environmental conditions, for example, the surrounding temperature, humidity, atmospheric pressure, gas concentration, wind velocity, altitude, sound volume, or light intensity.

Yet another embodiment of the invention provides an information authenticating apparatus, further comprising personal information storing means for storing personal information and personal information input means for entering personal information, wherein, when the personal information entered by the personal information input means and the personal information of the personal information storing means satisfy a prescribed relationship, the authenticating information adding means adds the personal information of the personal information storing means as authenticating information. In this configuration, when personal information is entered by the personal information input means, and if the entered personal information and the personal information of the personal information storing means satisfy a prescribed relationship, the personal information of the personal information storing means is added as authenticating information. Examples of personal information include, for example, ID codes assigned to individuals, information dependent on human physical features such as blood type or fingerprints, and information dependent on personal life environment such as an address and a phone number.

Satisfaction of a prescribed relationship includes agreement between personal information to be compared with reference personal information, agreement of personal information to be correlated with the result of calculation of a prescribed calculation formula with the use of reference personal information, and agreement of the result of calculation of a prescribed calculation formula with the use of reference personal information with the result of calculation of the prescribed calculation formula with the use of personal information to be correlated. The personal information storing means stores personal information by any means and at any time, and may have personal information stored in advance, or it may store personal information upon operation of the apparatus.

Yet another embodiment of the invention provides an information authenticating apparatus, further comprising apparatus information storing means for storing apparatus information intrinsic to the information authenticating apparatus, wherein the authenticating information adding means adds the apparatus information of the apparatus information storing means as authenticating information.

In this configuration, the apparatus information of the apparatus information storing means is added as authenticating information by the authenticating information adding means. The apparatus information storing means stores apparatus information by any means and at any time, and may have apparatus information stored in advance, or it may store apparatus information upon operation of the apparatus.

Yet another embodiment of the invention provides an information authenticating apparatus according to any one of claims 3 to 8, wherein the authenticating information adding means generates inspection information for inspecting whether or not the data contain an error, by the use of the data entered by the data input means, and adds the generated inspection information as authenticating information. In this configuration, the inspection information is generated by the authenticating information adding means by the use of the data entered by the data input means, and the thus generated inspection information is added as authenticating information.

The term inspection information means information for inspecting whether or not data contain an error. Conceivable pieces of inspection information include an error detecting code such as a parity check code and a group count check code, an error correcting code such as a CRC (cyclic redundancy check) and a Hamming code, inspecting information for carrying out a limited inspection and a complete check, and encrypted information prepared by encrypting data by means of prescribed encrypting keys.

Yet another embodiment of the invention provides an information authenticating apparatus, wherein the authenticating information adding means generates inspection information by means of a hash function using the data entered by the data input means. In this configuration, inspection information is generated by a hash function by using the data entered by the data input means with the authenticating information adding means.

Yet another embodiment of the invention provides an information authenticating apparatus, wherein the authenticating information adding means encrypts the data containing the added authenticating information. In this configuration, the data containing the authenticating information added thereto by the authenticating information adding means are encrypted. The encrypted data are transmitted by the transmitting means to the authenticating station.

Any encrypting method may be used, including, for example, the common key encrypting method or the public key encrypting method. Applicable encrypting methods include the block encrypting methods such as mixing/replacing encrypting methods including DES (data encryption standard), RCS, and FAL, power multiplication/remainder methods such as RSA, Elgomar cipher, DH method, and oval cipher, and stream encrypting methods such as RC4, Burnum cipher, and NLFSR.

Yet another embodiment of the invention provides an information authenticating apparatus, wherein the encryption is accomplished by the application of a public key encrypting method, and the authenticating information adding means encrypts the data containing the added authenticating information with a secret key of the information authenticating apparatus. In this configuration, the data containing the authenticating information added thereto by the authenticating information adding means are encrypted by the use of a secret key of the information authenticating apparatus.

Yet another embodiment of the invention provides an information authenticating apparatus according to any one of claims 3 to 12, further comprising receiving means for receiving the data containing the digital signature affixed by the authenticating station from the authenticating station, and data storing means for storing the data received by the receiving means. In this configuration, the data transmitted by the transmitting means and having the digital signature affixed thereto by the authenticating station is received by the receiving means from the authenticating station, and the received data are stored in the data storing means.

To achieve the aforementioned object of the present invention, on the other hand, yet another embodiment of the invention provides an authenticating station affixing a digital signature to the data transmitted from the information authenticating apparatus, comprising authenticating station-side receiving means for receiving data from the information authenticating apparatus, and digital signature affixing means for affixing a digital signature to the data received by the authenticating station-side receiving means, wherein, when input of the data by the data input means is authenticated, the digital signature affixing means affixes the digital signature to the data received by the authenticating station-side receiving means on the basis of the authenticating information added to the data received by the authenticating station-side receiving means.

In this configuration, when the data are received by the authenticating station-side receiving means from the information authenticating apparatus, and if input of the data by the data input means is authenticated on the basis of the authenticating information added to the data received by the authenticating station-side receiving means, the digital signature is affixed to the data received by the authenticating station-side receiving means.

Yet another embodiment of the invention provides an authenticating station, wherein the digital signature affixing means has authenticating station-side time measuring means for measuring time, and then the time specified by time information added as authenticating information of the data received by the authenticating station-side receiving means and the time measured by the authenticating station-side time measuring means satisfy a prescribed relationship, affixes the digital signature to the data received by the authenticating station-side receiving means.

In this configuration, when the time is measured by the authenticating station-side time measuring means, and the time specified by the time information added as authenticating information of the data received by the authenticating station-side receiving means and the time measured by the authenticating station-side time measuring means satisfy a prescribed relationship, the digital signature is affixed by the digital signature affixing means to the data received by the authenticating station-side receiving means.

Any authenticating station-side time measuring means is applicable as long as it can measure time. For example, it may measure the time lapse from a reference time, or it may measure the current time. It may also measure time from information acquired from outside by the use of an orbiting satellite, or it may measure time from internally generated information by incorporating a clock timer. Satisfaction of the prescribed relationship may be accomplished through agreement between the time to be compared and a reference time, or through a time difference between the time to be collated and the reference time being within a prescribed range.

Yet another embodiment of the invention provides an authenticating station, wherein the digital signature affixing means has authenticating station-side position measuring means, and when the position specified by the positional information added as authenticating information of the data received by the authenticating station-side receiving means and the position measured by the authenticating station-side position measuring means satisfy a prescribed relationship, affixes the digital signature to the data received by the authenticating station-side receiving means.

In this configuration, when the position of the information authenticating apparatus is measured by the authenticating station-side position measuring means, and the position specified 20: by the positional information added as authenticating information of the data received by the authenticating station-side receiving means and the position measured by the authenticating station-side position measuring means satisfy a prescribed relationship, the digital signature is affixed by the digital signature affixing means to the data received by the authenticating station-side receiving means.

Any authenticating station-side position measuring means may be used as long as it permits measurement of the position of the information authenticating apparatus. It may, for example, directly measure the position of the information authenticating apparatus through communication with the position measuring means of the information authenticating apparatus, or when the information authenticating apparatus transmits data via a cellular phone or a PHS, the position of the information authenticating apparatus may be indirectly measured by specifying a base station with which the information authenticating apparatus communicates.

Satisfaction of the prescribed relationship may be accomplished through agreement between the position to be compared and a reference position, or the fact that the position to be compared is within a prescribed range centered around the reference position, or the fact that the reference position is within a prescribed range centered around the position to be compared.

Yet another embodiment of the invention provides an authenticating station, comprising an authenticating station-side apparatus information storing means for storing apparatus information intrinsic to the information authenticating apparatus, wherein, when the apparatus information added as authenticating information of the data received by the authenticating station-side receiving means and the apparatus information of the authenticating station-side apparatus information storing means satisfy a prescribed relationship, the digital signature affixing means affixes the digital signature to the data received by the authenticating station-side receiving means.

In this configuration, when the apparatus information added as authenticating information of the data received by the authenticating station-side receiving means and the apparatus information of the authenticating station-side apparatus information storing means satisfy a prescribed relationship, the digital signature is affixed by the digital signature affixing means to the data received by the authenticating station-side receiving means.

Satisfaction of the prescribed relationship is accomplished, for example, through agreement between the apparatus information to be compared and reference apparatus information, or agreement between the result of calculation of a prescribed calculation formula of the reference apparatus information and apparatus information to be compared, or agreement between the result of a calculation of the prescribed calculation formula of the reference apparatus information and the result of calculation of the prescribed calculation formula of the apparatus information to be compared.

The authenticating station-side apparatus information storing means, which stores the apparatus information by any means and at any time, may have the apparatus information stored in advance, or it may store the apparatus information upon operation of the apparatus.

Yet another embodiment of the invention provides an authenticating station, wherein the digital signature affixing means generates inspection information by the use of the data received by the authenticating station-side receiving means, and when the generated inspection information and the inspection information added as authenticating information of the data received by the authenticating station-side receiving means satisfy a prescribed relationship, affixes the digital signature to the data received by the authenticating station-side receiving means.

In this configuration, the inspection information is generated by the same method as in the information authenticating apparatus of claim 9 by the use of the data received by the authenticating station-side receiving means, and when the thus generated inspection information and the inspection information added as authenticating information of the data received by the authenticating station-side receiving means satisfy the prescribed relationship, the digital signature is affixed by the digital signature affixing means to the data received by the authenticating station-side receiving means.

Satisfaction of the prescribed relationship is accomplished, for example, through agreement between the inspection information to be compared and reference inspection information, or agreement between the result of calculation of a prescribed calculation formula of the reference inspection information and the inspection information to be compared, or agreement between the result of a calculation of the prescribed calculation formula of the reference inspection information and the result of a calculation of the prescribed calculation formula of the inspection information to be compared.

Yet another embodiment of the invention provides an authenticating station, wherein the digital signature affixing means generates inspection information by the use of the data received by the authenticating station-side receiving means. In this configuration, inspection information is generated with the same hash function as in the information authenticating apparatus of claim 10 by the use of the data received by the authenticating station-side receiving means via the digital signature affixing means.

Yet another embodiment of the invention provides an authenticating station, wherein the digital signature affixing means deciphers the data received by the authenticating station-side receiving means by a deciphering method corresponding to the encrypting method of the information authenticating apparatus described above.

In this configuration, the data received by the authenticating station-side receiving means are deciphered by a deciphering method corresponding to the encrypting method of the information authenticating apparatus described above by the use of the digital signature affixing means. Any deciphering method may be adopted, including a common key deciphering method or a public key deciphering method. Thus deciphering method corresponds to, for example, the encrypting method suggested in the description above.

Yet another embodiment of the invention provides an authenticating station, wherein the digital signature affixing means deciphers the data received by the authenticating station-side receiving means by a public key of the information authenticating apparatus serving as the transmitting source of the data. In this configuration, the data received by the authenticating station-side receiving means are deciphered by the public key of the information authenticating apparatus serving as the transmitting source of the data via the digital signature affixing means.

Yet another embodiment of the invention provides an authenticating station, further comprising authenticating station-side transmitting means for transmitting data bearing the digital signature affixed thereto by the digital signature affixing means to the information authenticating apparatus.

In this configuration, the data containing the digital signature affixed thereto by the digital signature affixing means are transmitted by the authenticating station-side transmitting means to the information authenticating apparatus.

Yet another embodiment of the invention provides an authenticating station, further comprising authenticating station-side data storing means for storing the data containing the digital signature affixed thereto by the digital signature affixing means. In this configuration, the data bearing the digital signature affixed thereto by the digital signature affixing means are stored in the authenticating station-side data storing means.

The information authenticating apparatuses and the authenticating stations for achieving the aforementioned object have been proposed. However, the invention is not limited to them, but it is possible to propose the following information authenticating system which also achieves the above-mentioned object of the invention.

This information authenticating system is a system in which an authenticating station for affixing a digital signature and an information authenticating apparatus are communicably connected via a network. The information authenticating apparatus comprises data input means for entering data, personal information input means for entering personal information, personal information storing means for storing personal information, apparatus information storing means for storing apparatus information intrinsic to the information authenticating apparatus, authenticating information adding means for adding information for authenticating the input of the data by the data input means to the data entered by the data input means, and transmitting means for transmitting the data having the authenticating information added thereto by the authenticating information adding means to the authenticating station. The authenticating information adding means comprises time measuring means for measuring time, position measuring means for measuring position, environmental condition measuring means for measuring surrounding environmental conditions, time information generating means for generating time information for specifying a point in time when data are entered by the data input means on the basis of the time measured by the time measuring means, positional information generating means for generating positional information for specifying a point where data are entered by the data input means on the basis of the position measured by the position measuring means, environmental condition information generating means for generating environmental condition information for specifying environmental conditions at the point in time when data are entered by the data input means on the basis of the environmental conditions measured by the environmental condition measuring means, and inspection information generating means for generating inspection information for inspecting whether or not an error is contained in the data by the use of the data entered by the data input means, and when the personal information entered by the personal information input means and the personal information of the personal information storing means satisfy a prescribed relationship, adds the generated time information, positional information, environmental condition information and inspection information, as well as the apparatus information of the apparatus information storing means and the personal information of the personal information storing means, as authenticating information. The authenticating station comprises authenticating station-side receiving means for receiving data from the information authenticating apparatus, authenticating station-side apparatus information storing means for storing apparatus information intrinsic to the information authenticating apparatus, and digital signature affixing means for affixing a digital signature to the data received by the authenticating station-side receiving means. The digital signature affixing means comprises authenticating station-side time measuring means, authenticating station-side position measuring means for measuring the position of the information authenticating apparatus, and authenticating station-side inspection information generating means for generating inspection information by the use of the data received by the authenticating station-side receiving means by the same method as in the inspection information generating means, and affixes a digital signature to the data received by the authenticating station-side receiving means when the time specified by the time information added as authenticating information for the data received by the authenticating station-side receiving means and the time measured by the authenticating station-side time measuring means satisfy a prescribed relationship, when the position specified by the positional information added as the authenticating information for the data received by the authenticating station-side receiving means and the position measured by the authenticating station-side position measuring means satisfy a prescribed relationship, when the apparatus information added as the authenticating information for the data received by the authenticating station-side receiving means and the apparatus information of the authenticating station-side apparatus information storing means satisfy a prescribed relationship, and when the generated inspection information and the inspection information added as the authenticating information for the data received by the authenticating station-side receiving means satisfy a prescribed relationship.

In this configuration of the information authenticating apparatus, data are entered by the data input means, and at the same time, when personal information is entered by the personal information input means, authenticating information is added by the authenticating information adding means to the data entered by the data input means, and the data containing the authenticating information added thereto by the authenticating information adding means are transmitted to the authenticating station by the transmitting means.

In the course of adding the authenticating information, the time information is generated by the time information generating means on the basis of the time measured by the time measuring means, the positional information is generated by the positional information generating means on the basis of the position measured by the position measuring means, the environmental condition information is generated by the environmental condition information generating means on the basis of the environmental conditions measured by the environmental condition measuring means, and the inspection information is generated by the inspection information generating means by the use of the data entered by the data input means. When the entered personal information and the personal information of the personal information storing means satisfy a prescribed relationship, the generated time information, positional information, environmental condition information, and inspection information, as well as the apparatus information of the apparatus information storing means and the personal information of the personal information storing means, are added as the authenticating information.

In the authenticating station, on the other hand, when data are received by the authenticating station-side receiving means from the information authenticating apparatus, input of the data by the data input means is authenticated on the basis of the authenticating information added to the data received by the authenticating station-side receiving means, and a digital signature is affixed by the digital signature affixing means to the data received by the authenticating station-side receiving means.

In the course of adding the digital signature, the inspection information is generated by the authenticating station-side inspection information generating means by the use of the data received by the authenticating station-side receiving means by the same method as in the inspection information generating means. When the time specified by the time information added as authenticating information for the data received by the authenticating station-side receiving means and the time measured by the authenticating station-side time measuring means satisfy a prescribed relationship, when the position specified by the positional information added as the authenticating information for the data received by the authenticating station-side receiving means and the position measured by the authenticating station-side position measuring means satisfy a prescribed relationship, when the apparatus information added as the authenticating information for the data received by the authenticating station-side receiving means and the apparatus information of the authenticating station-side apparatus information storing means satisfy a prescribed relationship, and when the generated inspection information and the inspection information added as the authenticating information for the data received by the authenticating station-side receiving means satisfy a prescribed relationship, the digital signature is affixed to the data received by the authenticating station-side receiving means.

It is to be understood that both the foregoing general description and the following detailed description are exemplary and explanatory and are intended to provide further explanation of the invention as claimed.

BRIEF DESCRIPTION OF THE DRAWINGS

FIG. 1 is a block diagram showing the configuration of the information authenticating system.

FIG. 2 is a block diagram showing the configuration of the information processing unit 40.

FIG. 3 is a flowchart showing authenticating information adding processing.

FIG. 4 is a block diagram showing the configuration of the information processing unit 50.

FIG. 5 is a flowchart showing the digital signature affixing processing.

DETAILED DESCRIPTION OF THE PREFERRED EMBODIMENTS

Embodiments of the present invention will now be described with reference to the drawings. FIGS. 1 to 5 illustrate an embodiment of the information authenticating apparatus and the authenticating station of the invention.

In this embodiment, the information authenticating apparatus and the authenticating station of the invention are used for authentication of digital data comprising a digital image taken with a digital camera 10 as shown in FIG. 1.

Firstly, the configuration of an information authenticating system achieved by the application of the information authenticating apparatus and the authenticating station of the invention will be described with reference to FIG. 1. FIG. 1 is a block diagram showing the configuration of the information authenticating system.

As shown in FIG. 1, this information authenticating system is composed by connecting an authenticating station 200 which affixes a digital signature and an information authenticating apparatus 100 via a network for communication therebetween. The information authenticating apparatus 100 is not usually connected to the authenticating station 200, but is connected to the authenticating station 200 only when authenticating digital data. While only one information authenticating apparatus 100 is shown to facilitate understanding of the invention, a plurality of different information authenticating apparatuses can actually be connected to the authenticating station 200.

The information authenticating apparatus 100 comprises a digital camera 10 which takes in digital data composing a digital image, a personal information input unit 12 to which personal information is input, a personal information storage unit 14 which stores the personal information, an apparatus information storage unit 16 which stores apparatus information intrinsic to the information authenticating apparatus 100, an authenticating information adding section 120 which adds authenticating information for authenticating input of digital data by the digital camera 10 to the digital data incorporated in the digital camera 10, a communication unit 18 which communicates with the authenticating station 200 through a network, a data storage unit 20 which stores the digital data having a digital signature affixed thereto by the authenticating station 200, and an output terminal 22 for outputting the digital data of the data storage unit 20 to the outside.

The personal information input unit 12 comprises an input device such as a keyboard and IDs assigned to individual users using the information authenticating apparatus 100 and passwords corresponding to the IDs are input thereby.

The personal information storage unit 14 stores encrypted personal information prepared by encrypting IDs assigned to the individual users using the information authenticating apparatus 100 and the passwords corresponding to these IDs. The IDs and the passwords are encrypted, for example, by an encrypting algorithm for personal IDs in the authenticating station 200.

The apparatus information storage unit 16 stores encrypted apparatus information prepared by encrypting the apparatus information intrinsic to the information authenticating apparatus 100 (for example, a number unique to the apparatus). Apparatus information here means apparatus information encrypted by an apparatus encrypting algorithm in the authenticating station 200.

The communication unit 18 specifies a base station closest to the current position by the use of a cellular phone or a PHS, connects the same to a network by radio via a general public line network, and transmits the digital data to the authenticating station 200 through the network.

The configuration of the authenticating information adding section 120 will now be described in detail. The authenticating information adding section 120 comprises a time measuring unit 42 for measuring time, a position measuring unit 44 for measuring position, a plurality of sensors $S_1$ to $S_n$ for measuring the surrounding environmental condition, a user authenticating unit 46 which authenticates a user by comparing personal information entered by the personal information input unit 12 with the personal information of the personal information storage unit 14, and an information processing unit 40 which generates authenticating information and adds the same to the digital data entered by the digital camera 10.

The time measuring unit 42 receives time signals from an orbiting satellite transmitting time signals indicating the current time, and measures the current time on the basis of the received time signals.

The position measuring unit 44 receives time signals from an orbiting satellite transmitting time signals indicating the current time, and measures the current position by the use of a so-called GPS which measures a position on the basis of a time shift derived from time signals and the orbit of the orbital satellites.

The sensors $S_1$ to $S_n$ measure the surrounding environmental conditions including, for example, the surrounding temperature, humidity, atmospheric pressure, gas concentration, wind velocity, altitude, sound volume, and light intensity. Known measuring instruments are applicable as sensors for measuring these physical quantities.

When requested to authenticate a user from the information processing unit 40, the user authenticating unit 46 receives an ID and a password input by means of the personal information input unit 12, reads out encrypted personal information from the personal information storage unit 14 for deciphering, and determines whether or not the entered ID and password agree with the deciphered ID and password. When they are determined to be in agreement as a result of the above determination, user authentication data proving that he is a proper user are issued to the information processing unit 40. When they are determined not to be in agreement, data proving that he is not a proper user are issued to the information processing unit 40.

The configuration of the information processing unit 40 will now be described with reference to FIG. 2. FIG. 2 is a block diagram showing the configuration of the information processing unit 40. As shown in FIG. 2, the information processing unit 40 comprises a CPU 60 which controls calculations and the overall system on the basis of a control program, ROM 62 which has the control program and the like of the CPU 60 previously stored therein in a prescribed area, RAM 64 for storing data read out from the ROM 62 or the like and results of calculation necessary for the calculations process of the CPU 60, and an I/F 68 mediating data input/output to and from external devices, and these components are connected together so as to be capable of exchanging data via a bus 69 which is a signal line for transferring data.

The I/F 68 is connected to external devices such as the digital camera 10, the personal information storage unit 14, the apparatus information storage unit 16, the communication unit 18, the data storage unit 20, the output terminal 22, the time measuring unit 42, the position measuring unit 44, the sensors $S_1$ to $S_n$, and the user authenticating unit 46.

The CPU 60 comprises a micro-processing unit MPU or the like, and when power is turned on, it starts up the prescribed program stored in a prescribed area of the ROM 62 to execute the authenticating information adding processing shown in the flowchart of FIG. 3. FIG. 3 is a flowchart illustrating the authenticating information adding steps.

The authenticating information adding processing comprises the steps of generating authenticating information by the use of an external device connected to the I/F 68, and adding the thus generated authenticating information to the digital data captured by the digital camera 10. Upon execution by the CPU 60, the process first goes to step S100 as shown in FIG. 3.

In step S100, user authentication request is output to the user authenticating unit 46, and then in step S102, the user authenticating data are entered from the user authenticating unit 46 to determine whether or not the entered user authenticating data shows a proper user. When the user is determined to be a proper one (Yes), the process proceeds to step S104.

In step S104, it is determined whether or not the digital data forming a digital image have been entered from the digital camera 10, and if input of the digital data is determined (Yes), the process goes to step S106, and the current time is entered from the time measuring unit 42. Time information for specifying a point in time when the digital data have been entered from the digital camera 10 is generated on the basis of the thus entered current time, and the process advances to step S108.

In step S108, the current position is entered from the position measuring unit 44, and positional information for specifying the point at which the digital data are entered by the digital camera 10 is generated on the basis of the position of the input. Then in step S110, the surrounding environmental conditions are entered from the sensors $S_1$ to $S_n$, and environmental condition information for specifying the environmental conditions at the point of time of input of the digital data by the digital camera 10 is generated on the basis of the thus entered environmental conditions, to go to step S112.

In step S112, personal information is read out from the personal information storage unit 14, and then in step S114, apparatus information is read out from the apparatus information storage unit 16. Then in step S116, the generated time information, positional information, and environmental condition information, as well as the read-out personal information and apparatus information, are added as authenticating information to the digital data entered by the digital camera 10, to proceed to step S118. In step S116, more specifically, the authenticating information is added to the digital data as a digital watermark or subliminal information.

In step S118, inspection information for inspecting as to whether or not an error is contained in the digital data is generated by incorporating the digital data having the authenticating information added thereto into a prescribed hash function as a hash value derived from the hash function. Then in step S120, the generated inspection information is added as further authenticating information to the digital data entered by the digital camera 10. Then in step S122, for example, the authenticating information is added to the digital data as a digital watermark or subliminal information.

In step S122, the digital data added with the authenticating information is encrypted with a secret key of the information authenticating apparatus 100 by a public key encrypting method, and then in step S124, the encrypted digital data are output to the communication unit 18 to be transmitted to the authenticating station 200. The process then advances to step S126.

In step S126, the digital data containing the digital signature affixed thereto in the authenticating station 200 are received from the authenticating station 200, and it is determined whether or not the data have been entered from the communication unit 18. When it is determined that the digital data having the digital signature affixed thereto have been entered (Yes), the entered digital data are stored in the data storage unit 20 in step S128, to go to step S130.

In step S130, it is determined whether or not digital data output is requested by the user. If the presence of an digital data output request is determined (Yes), the digital data of the data storage unit 20 is output to the output terminal 22 in step S132, to go to step S104. In step S130, on the other hand, if the absence of an digital data output request from the user is determined (No), the process advances to step S104.

In step S126, on the other hand, if it is determined that the digital data having the digital signature affixed thereto is not entered from the communication unit 18 (No), the process is in standby in step S126 until the digital data are entered. In step S104, on the other hand, if it is determined that the digital data are not entered from the digital camera 10 (No), the process skips to step S130. In step S117, on the other hand, if it is determined that the user authenticating data indicates an improper user (No), power is forcedly turned off in step S1134, and the series of steps terminates.

Referring again to FIG. 1, the configuration of the authenticating station 200 will be described. As shown in FIG. 1, the authenticating station 200 comprises the communication unit 24 which communicates via the information authenticating apparatus 100 and the network, the personal information storage unit 26 which stores personal information, the apparatus information storage unit 28 which stores apparatus information, and a digital signature affixing section 220 which affixes the digital signature to the digital data received by the communication unit 24.

The personal information storage unit 26 stores the same IDs and passwords as those stored in the personal information storage unit 14, which are IDs assigned to the individual users using the information authenticating apparatus specified by the apparatus information of the apparatus information storage unit 28 and the passwords corresponding to such IDs. The personal information of the personal information storage unit 26 is correlated with the apparatus information of the apparatus information storage unit 28. As a result of this correlation, it is possible to specify an ID and a password for a particular user for an information authenticating apparatus specified by the apparatus information of the apparatus information storage unit 28. This correlation is accomplished by a person who wishes to use the information authenticating apparatus 100 and reports that intention to the authenticating station 200 prior to use.

The configuration of the digital signature affixing section 220 will now be described in detail. The digital signature affixing section 220 comprises a time measuring unit 52 which measures time, a position measuring unit 54 which measures the position of the information authenticating apparatus 100, and an information processing unit 50 which affixes the digital signature to the digital data received by the communication unit 24.

The time measuring unit 52 has the same functions as those of the time measuring unit 42, receives time signals from an orbiting satellite transmitting time signals indicating the current time, and measures the current time on the basis of the received time signals. The position measuring unit 54 measures the position of the information authenticating apparatus 100 by specifying a base station communicating with the information authenticating apparatus 100 while the communication unit 24 communicates with the information authenticating apparatus 100. The base station is specified by a conventional method.

The configuration of the information processing unit 50 will now be described with reference to FIG. 4. FIG. 4 is a block diagram showing the configuration of the information processing unit 50. As shown in FIG. 4, the information processing unit 50 comprises a CPU 70 which controls calculations and the overall system on the basis of a control program, a ROM 72 in which the control program and the like of the CPU 70 are stored in advance in a prescribed area, a RAM 74 for storing data read out from the ROM 72 or the like and results of calculations necessary for the calculation process of the CPU 70, and an I/F 78 mediating data input/output to and from an external device, and these components are connected together so as to be capable of exchanging data via a bus 79 which is a signal line for transferring data. The I/F 78 is connected to external devices including the communication unit 24, the personal information storage unit 26, the apparatus information storage unit 28, the time measuring unit 52, and the position measuring unit 54.

The CPU 70 comprises a micro-processing unit MPU or the like, starts up a prescribed program stored in a prescribed area of the ROM 72, and continually executes the digital signature affixing processing shown in the flowchart of FIG. 5. FIG. 5 is a flowchart showing the digital signature affixing processing. The digital signature affixing processing is for affixing the digital signature to the digital data received by the communication unit 24. When it is executed by the CPU 70, the process goes first to step S200 as shown in FIG. 5.

In step S200, it is determined whether or not the digital data have been received from the information authenticating apparatus 100 and entered from the communication unit 24. If the digital data are determined to have been entered (Yes), the process advances to step S202, and the entered digital data are deciphered with a public key of the information authenticating apparatus 100, which is the transmitting source of the digital data, by the application of the public key deciphering method, to go to step S204.

In step S204, the current time is entered from the time measuring unit 52, and it is determined whether or not the time difference between the time specified by the time information added as authenticating information of the deciphered digital data and the time entered from the time measuring unit 52 is within a prescribed range (for example, one minute). If the time difference is determined to be within the prescribed range (Yes), the process advances to step S206.

In step S206, the position of the information authenticating apparatus 100 which is the transmitting source of the digital data is entered from the position measuring unit 54 to determine whether or not the position specified by the positional information added as the authenticating information of the deciphered digital data is within a prescribed range (for example, a radius of 300 m) centered around the position entered from the position measuring unit 54. If it is determined to be within the prescribed range (Yes), the process goes to step S208.

In step S208, the apparatus information added as the authenticating information for the deciphered digital data is deciphered, and then, in step S210, the apparatus information storage unit 28 is retrieved on the basis of the deciphered apparatus information. Then in step S212, it is determined whether or not the apparatus information corresponding to the deciphered apparatus information is retrieved, and if the corresponding apparatus information is determined to have been retrieved (Yes), the process proceeds to step S214.

In step S214, the personal information added as the authenticating information for the deciphered digital data is deciphered, and then, in step S216, related personal information is read out by retrieving the personal information storage unit 26 on the basis of the apparatus information retrieved in step S212. Then, in step S218, it is determined whether or not the ID and the password which are deciphered personal information and the ID and the password which are read out personal information are in agreement. If they are in agreement (Yes), the process goes to step S220.

In step S220, the inspection information for inspecting whether or not the portion of the deciphered digital data except for the inspection information added as the authenticating information contains an error by incorporating the same hash function as that in step S118 above is generated as a hash value obtained from the first hash function. Then in step S222, it is determined whether or not the generated inspection information and the inspection information added as the authenticating information for the deciphered digital data are in agreement. If they are determined to be in agreement (Yes), the process goes to step S224.

In step S224, a digital signature is affixed to the deciphered digital data, and then, in step S226, the digital data containing the digital signature affixed thereto are encrypted with a secret key of the authenticating station 200 by the application of the public key encrypting method. Then, in step S228, the encrypted digital data are output to the communication unit 24, and the output is transmitted to the information authenticating apparatus 100 which is the transmitting source of the digital data, to go to step S200.

In step S222, on the other hand, if it is determined that the inspection information generated with the hash function and the inspection information added as the authenticating information for the deciphered digital data are not in agreement (No), the digital signature is not affixed as the digital data is improper, and the process moves to step S200.

In step S218, on the other hand, if it is determined that the ID and the password which are deciphered personal information and the ID and the password which are read out personal information are not in agreement (No), the digital signature is not affixed as the digital data is improper, and the process advances to step S200. In step S212, on the other hand, if it is determined that apparatus information corresponding to the deciphered apparatus information is not retrieved (No), the digital signature is not affixed as the digital data is improper, and the process goes to step S200.

In step S206, on the other hand, if it is determined that the position specified by the positional information added as the authenticating information for the deciphered digital data is not contained within a prescribed range centered around the position entered from the position measuring unit 54 (No), the digital signature is not affixed as the digital data is improper, and the process goes to step S200.

In step S204, on the other hand, if it is determined that the time difference between the time specified by the time information added as the authenticating information for the deciphered digital data and the time entered from the time measuring unit 52 is outside a prescribed range (No), the digital signature is not affixed as the digital data is improper, and the process goes to step S200. In step S200, on the other hand, if it is determined that the digital data are not entered from the communication unit 24 (No), the process is in standby until the digital data are entered.

The operation of the aforementioned embodiment will now be described. In order to capture a digital image by means of the digital camera 10, the user must first turn on power for the information authenticating apparatus 100, and enter an ID and a password from the personal information storage unit 12. On the assumption that the user enters a proper ID and password reported to the authenticating station 200, in the information authenticating apparatus 100, the encrypted personal information is read out from the personal information storage unit 14 by the user authenticating unit 46 and deciphered. Since the ID and the password entered from the personal information input unit 12 and the deciphered ID and password are in agreement, the user authenticating data certifying the proper user are output to the information processing unit 40. Upon input of the user authenticating data showing that the user is a proper user, in the information processing unit 40, the CPU 60 authenticates that he is a proper user via steps S100 and S102, and it is now possible to capture a digital image by means of the digital camera 10.

When the user captures the digital image by means of the digital camera 10, the digital data are input from the digital camera 10 to the information processing unit 40. Time information is thus generated on the basis of the time measured by the time measuring unit 42 through steps S106 to S116, positional information is generated on the basis of the position measured by the position measuring unit 44, and environmental condition information is generated on the basis of the environmental conditions measured by the sensors $S_1$ to $S_n$. Then, personal information is read out from the personal information storage unit 14. Apparatus information is read out from the apparatus information storage unit 16. The generated time information, positional information, and environmental condition information, as well as the read out personal information and apparatus information, are added as authenticating information to the digital data entered by the digital camera 10.

Then, through steps S118 to S124, inspection information as a hash value is generated with a hash function by the use of the digital data having authenticating information added thereto, and the thus generated inspection information is further added to the digital data entered by the digital camera 10 as authenticating information. The digital data containing the authenticating information added thereto are encrypted with a secret key of the information authenticating apparatus 100, and the thus encrypted digital data are output to the communication unit 18. The closest base station to the current position is specified by the communication unit 18, and it is connected by ratio to a network via a general public line network. The digital data are transmitted to the authenticating station 200 via the network.

In the authenticating station 200, when the digital data are received by the communication unit 24 from the information authenticating apparatus 100, the received digital data are output to the information processing unit 50. In the information processing unit 50, when the digital data are entered from the communication unit 24, the entered digital data are deciphered by the CPU 70 with the public key of the information authenticating apparatus 100 through steps S202 and S204, and it is determined whether or not the time difference between the time specified by the time information added as the authenticating information for the deciphered digital data and the time measured by the time measuring unit 52 is within a prescribed range. Since the time information added as the authenticating information is proper information generated by the information authenticating apparatus 100, the time difference is determined to be within the prescribed range.

Then, through step S206, it is determined whether or not the position specified by the positional information added as the authenticating information for the deciphered digital data is contained within a prescribed range centered around the position measured by the position measuring unit 54. Because the positional information added as the authenticating information is proper information generated by the information authenticating apparatus 100, the position specified by the positional information is determined to be contained within the prescribed range.

Then, through steps S208 to S212, the apparatus information added as the authenticating information for the deciphered digital data is deciphered, and the apparatus information storage unit 28 is retrieved on the basis of the deciphered apparatus information. It is determined whether or not the apparatus information corresponding to the deciphered apparatus information is retrieved. Since the deciphered apparatus information is proper information given by the information authenticating apparatus 100, the same apparatus information is registered in the apparatus information storage unit 28. It is thus determined that the corresponding apparatus information has been retrieved.

Then, through steps S214 to S218, the personal information added as the authenticating information for the deciphered digital data is deciphered, and related personal information is read out through retrieval of the personal information storage unit 26 on the basis of the retrieved apparatus information to determine whether or not the ID and the password which are deciphered personal information and the ID and the password which are read out personal information are in agreement with each other. Since the deciphered personal information is proper information given by the information authenticating apparatus 100, they are determined to be in agreement.

Then, through steps S220 and S222, inspection information is generated in the form of a hash value with a hash function, using a portion of the deciphered digital data except for the inspection information added as the authenticating information to determine whether or not the generated inspection information and the inspection information added as the authenticating information for the deciphered digital data are in agreement. Since the inspection information added as the authenticating information is proper information generated by the information authenticating apparatus 100, they are determined to be in agreement.

Then, through steps S224 to S228, a digital signature is affixed to the deciphered digital data. The digital data having the digital signature affixed thereto are encrypted with the secret key of the authenticating station 200, and the encrypted digital data are output to the communication unit 24. The digital data are then transmitted to the information authenticating apparatus 100 via the network.

In the information authenticating apparatus 100, on the other hand, when the digital data are received from the authenticating station 200 by the communication unit 18, the received digital data are output to the information processing unit 40. In the information processing unit 40, the digital data are entered from the communication unit 18, and the entered digital data are stored in the data storage unit 20 by the CPU 60 through steps S126 and S128.

When the user requests output of the digital data, the digital data of the data storage unit 20 are output to the output terminal 22 through steps S130 and S132. The digital data output from the output terminal 22 are stored, for example, in a floppy disk.

If any of digital data, time information, positional information, personal information, apparatus information, and inspection information is unduly altered from among the digital data having the authenticating information added thereto, the unduly altered digital data are determined through any of steps S204, S206, S212, S218 and S222, and no digital signature is affixed.

When the digital data received by the authenticating station 200 are unduly encrypted with a key other than the secret key of the information authenticating apparatus 100, which is the transmitting source of the digital data, the digital data are not deciphered in the authenticating station 200 through step S202, but are disposed of as improper digital data.

When the digital signature is unduly affixed outside the authenticating station 200, the digital data output from the information authenticating apparatus 100 cannot be deciphered with the public key of the authenticating station 200, thus revealing that they are improper digital data.

When the user enters improper ID and password not reported to the authenticating station 200 upon turning on power for the information authenticating apparatus 100, power is forcedly turned off in the information authenticating apparatus 100 through steps S102 and S1134.

In this embodiment, as described above, the information authenticating apparatus 100 comprises the digital camera for capturing digital data, and the authenticating information adding section 120 which generates the authenticating information on the basis of information acquired from outside and adds the same to the digital data entered by the digital camera.

As a result, the authenticating information added to the digital data has a higher objectivity as compared with the case where authenticating information generated on the basis of internally generated information is added. The objectivity of the digital data is therefore ensured as compared with the conventional art, thus permitting an improvement of the probative value of the digital data as evidence.

In this embodiment, furthermore, the information authenticating apparatus 100 comprises the digital camera 10 for capturing the digital data, the authenticating information adding section which adds the authenticating information to the digital data entered by the digital camera 10, and the communication unit 18 which transmits the digital data containing the authenticating information added thereto by the authenticating information adding section 120 to the authenticating station 200.

As a result, the authenticating information added to the digital data has a higher objectivity as compared with the case where authenticating information generated on the basis of internally generated information is added. The objectivity of the digital data is therefore ensured as compared with the conventional art, thus permitting an improvement of the probative value of the digital data as evidence.

In this embodiment, the authenticating information adding section 120 generates time information on the basis of the time measured by the time measuring unit 42, and adds the generated time information as the authenticating information.

As a result, it is possible to specify the point in time when the digital data are entered from the authenticating information added to the digital data, and in addition, the authenticating information has a high objectivity, thus permitting a further improvement of the probative value of the digital data as evidence.

In this embodiment, the authenticating information adding section 120 generates positional information on the basis of the position measured by the position measuring unit 44, and adds the generated positional information as the authenticating information.

As a result, it is possible to specify the point where the digital data are entered from the authenticating information added to the digital data, and in addition, the authenticating information has a high objectivity, thus permitting a further improvement of the probative value of the digital data as evidence.

In this embodiment, the authenticating information adding section 120 generates environmental condition information on the basis of the environmental conditions measured by the sensors $S_1$ to $S_n$, and adds the generated environmental condition information as the authenticating information. As a result, it is possible to specify the environmental condition at the point in time of input of the digital data, and in addition, the authenticating information has high objectivity, thus permitting a further improvement of the probative value of the digital data as evidence.

In this embodiment, the authenticating information adding section 120 adds the personal information of the personal information storage unit 14 as the authenticating information when the personal information entered by the personal information input unit 12 and the personal information of the personal information storage unit 14 are in agreement. As a result, it is possible to specify the user who has entered the digital data from the authenticating information added to the digital data, and in addition, the authenticating information has high objectivity, thus permitting a further improvement of the probative value of the digital data as evidence.

In this embodiment, the authenticating information adding section 120 adds the apparatus information of the apparatus information storage unit 16 as the authenticating information.

As a result, it is possible to specify the unit having entered the digital data from the authenticating information added to the digital data, and in addition, the authenticating information has high objectivity, thus permitting a further improvement of the probative value of the digital data as evidence.

In this embodiment, the authenticating information adding section 120 generates inspection information by the use of the digital data entered by the digital camera 10, and adds the generated inspection information as the authenticating information. As a result, it is possible to determine whether or not the digital data are altered from the authenticating information added to the digital data, and in addition, the authenticating information has high objectivity, thus permitting a further improvement of the probative value of the digital data as evidence.

In this embodiment, the authenticating information adding section 120 encrypts the digital data containing the authenticating information added thereto with the secret key of the information authenticating apparatus 100. As a result, in the authenticating section 200, the received digital data can be deciphered only with the public key of the information authenticating apparatus 100 which is the transmitting source of the digital data. When the digital data can be deciphered, therefore, it is known that the digital data entered by the information authenticating apparatus 100 are those having been transmitted from the information authenticating apparatus 100. If not, it is known that data are not those transmitted from the information authenticating apparatus 100, thus permitting a further improvement of the probative value of the digital data as evidence.

In this embodiment, on the other hand, the authenticating station 200 comprises the communication unit 24 which receives the digital data from the information authenticating apparatus 100, and the digital signature affixing section 220 which affixes the digital signature to the digital data received by the communication unit 24. The digital signature affixing section 220 affixes the digital signature to the digital data received by the communication unit 24 when input of the digital data by the digital camera 10 is authenticated on the basis of the authenticating information added to the digital data received by the communication unit 24. As a result, when the authenticating information added to the digital data is altered or when the digital data are unduly transmitted, the digital signature is not affixed to the digital data. It is therefore possible to ensure a higher objectivity of the digital data as compared with the conventional art, thus permitting an improvement of the probative value of the digital data as evidence.

In this embodiment, the digital signature affixing section 220 affixes the digital signature to the digital data received by the communication unit 24 when the time difference between the time specified by the time information added as the authenticating information for the digital data received by the communication unit 24 and the time measured by the time measuring unit 52 is within a prescribed range. As a result, when the time information added as the authenticating information for the digital data is altered, the digital signature is not affixed to the digital data. It is therefore possible to ensure a higher objectivity of the digital data as compared with the conventional art, thus permitting a further improvement of the probative value of the digital data as evidence.

In this embodiment, the digital signature affixing section 220 affixes the digital signature to the digital data received by the communication unit 24 when the position specified by the positional information added as the authenticating information for the digital data received by the communication unit 24 is within a prescribed range centered around the position measured by the position measuring unit 54. As a result, when the positional information added as the authenticating information for the digital data is altered, the digital signature is not affixed to the digital data. It is therefore possible to ensure a higher objectivity of the digital data as compared with the conventional art, thus permitting a further improvement of the probative value of the digital data as evidence.

In this embodiment, the digital signature affixing section 220 affixes the digital signature to the digital data received by the communication unit 24 when the apparatus information added as the authenticating information for the digital data received by the communication unit 24 and the apparatus information of the apparatus information storage unit 28 are in agreement. As a result, when the apparatus information added as the authenticating information for the digital data is altered, the digital signature is not affixed to the digital data. It is therefore possible to ensure a higher objectivity of the digital data as compared with the conventional art, thus permitting a further improvement of the probative value of the digital data as evidence.

In this embodiment, the digital signature affixing section 220 generates inspection information by the use of the digital data received by the communication unit 24, and affixes the digital signature to the digital data received by the communication unit 24 when the generated inspection information and the inspection information added as the authenticating information for the digital data received by the communication unit 24 are in agreement. As a result, when the inspection information added as the authenticating information for the digital data or the digital data themselves are altered, the digital signature is not affixed to the digital data. It is therefore possible to ensure a higher objectivity of the digital data as compared with the conventional art, thus permitting a further improvement of the probative value of the digital data as evidence.

In the aforementioned embodiment, the authenticating station 200 is not particularly configured so that information is added to the digital data when transmitting the digital data having the digital signature affixed thereto to the information authenticating apparatus 100. The inspection information for inspecting whether or not an error is contained in the digital data may be generated by incorporating a prescribed hash function for the digital data received by the communication unit 24 (including the authenticating information) after the completion of step S222, in the form of a hash value derived from a hash function, and the generated inspection information may be added to the digital data.

In this configuration, it is possible to verify that the digital data is proper by means of the added inspection information in the information authenticating apparatus 100. It is therefore possible to ensure a higher objectivity of the digital data and further improve the probative value of the digital data as evidence.

In the aforementioned embodiment, the authenticating station 200 transmits the digital data containing the digital signature affixed thereto to the information authenticating apparatus 100, and the information authenticating apparatus 100 stores the received digital data in the data storage unit 20. The configuration is not however limited to this, but the authenticating station 200 may have a data storage unit storing the digital data, and store the digital data having the digital signature affixed thereto in the data storage unit. In this case, the information authenticating apparatus 100 can be configured without a data storage unit 20 or an output terminal 22.

In the aforementioned embodiment, the information authenticating apparatus 100 has the time measuring unit 42 so as to add time information as the authenticating information to the digital data. The configuration is not however limited to this, but the information authenticating apparatus 100 may have a configuration without a time measuring unit 42 so as not to add time information. In this case, the authenticating station 200 may have a configuration without a time measuring unit 52 so as not to determine the time on the basis of the time information.

In the aforementioned embodiment, the information authenticating apparatus 100 has a position measuring unit 44 so as not to add positional information as authenticating information to the digital data. The configuration is not however limited to this, but the information authenticating apparatus 100 may have a configuration without a position measuring unit 44 so as not to add the positional information. In this case, the authenticating station 200 may have a configuration without a position measuring unit 54 so as not to conduct a determination based on the positional information.

In the aforementioned embodiment, the information authenticating apparatus 100 has the sensors $S_1$ to $S_n$ so as to add environmental condition information as authenticating information to the digital data. The configuration is not however limited to this, but the information authenticating apparatus 100 may have a configuration without sensors $S_1$ to $S_n$ so as not to add environmental condition information.

In the aforementioned embodiment, the information authenticating apparatus 100 has the personal information input unit 12, the personal information storage unit 14, and the user authenticating unit 46 so as to add personal information as authenticating information to the digital data. The configuration is not however limited to this, but the information authenticating apparatus 100 may have a configuration without these units so as not to add personal information. In this case, the authenticating station 200 may have a configuration without a personal information storage unit 26 so as not to carry out a determination based on the personal information.

In the aforementioned embodiment, the information authenticating apparatus 100 has the apparatus information storage unit 16 so as to add apparatus information as authenticating information to the digital data. The configuration is not however limited to this, but the information authenticating apparatus 100 may have a configuration without an apparatus information storage unit 16 so as not to add apparatus information. In this case, the authenticating station 200 may have a configuration without an apparatus information storage unit 28 so as not to conduct a determination based on apparatus information.

In the aforementioned embodiment, the information authenticating apparatus 100 has a configuration in which inspection information is added as authenticating information to the digital data. The configuration is not however limited to this, but the information authenticating apparatus 100 may have a configuration not adding inspection information. In this case, the authenticating station 200 may have a configuration not conducting a determination based on the inspection information.

In the aforementioned embodiment, the information authenticating apparatus 100 has a configuration in which the digital data having the authenticating information added thereto are encrypted for transmission. The configuration is not however limited to this, but the information authenticating apparatus 100 may have a configuration in which the digital data containing the authenticating information are not encrypted and transmitted. In this case, the authenticating station 200 may have a configuration not deciphering the received digital data.

In the aforementioned embodiment, the case where the control programs stored previously stored in the ROMs 62 and 72 are executed have been described for execution of the processes shown in the flowcharts of FIGS. 3 and 5. The configuration is not however limited to this, but the programs implementing these procedures may be read from a storage medium storing these programs into the RAMs 64 and 74 for execution.

The storage medium used here means a semiconductor storage medium such as a RAM or a ROM, a magnetic storage type storage medium such as an FD or an HD, an optical reading type storage medium such as a CD, a CDV, an LD, or a DVD, or a magnetic-storage/optical-reading type storage medium such as an MO, and can be any storage media so far as it is machine-readable, irrespective of the reading method such as electronic, magnetic, or optical.

In the aforementioned embodiment, the digital camera 10 corresponds to the data input means as defined in claims 1 to 6, 9 and 10. The authenticating information adding section 120 corresponds to the authenticating information adding means defined in claims 1 to 12. The communication unit 18 corresponds to the transmitting means of claim 1 and the receiving means of claim 13. The time measuring unit 42 corresponds to the time measuring means of claim 4. The position measuring unit 44 corresponds to the position measuring means of claim 2 or 5.

In the aforementioned embodiment, the sensors $S_1$ to $S_n$ correspond to the environmental condition measuring means of claim 6. The personal input unit 12 corresponds to the personal information input means of claim 7. The personal information storage unit 14 corresponds to the personal information storing means of claim 7. The apparatus information storage unit 16 corresponds to the apparatus information storing means of claim 8. The data storage unit 20 corresponds to the data storing means of claim 13.

In the aforementioned embodiment, the communication unit 24 corresponds to the receiving means of claims 14 to 21 and the transmitting means of claim 23. The digital signature affixing section 220 corresponds to the digital signature affixing means of claims 14 to 23. The time measuring unit 52 corresponds to the authenticating station-side time measuring means of claim 15. The position measuring unit 54 corresponds to the authenticating station-side position measuring means of claim 16. The apparatus information storage unit 26 corresponds to the authenticating station-side apparatus information storing means of claim 17.

According to one embodiment of the present invention, as described above, the authenticating information added to the data has a high objectivity. It is therefore possible to ensure objectivity of the data as compared with the conventional art, and to improve the probative value of the data as evidence.

According to another embodiment of the present invention, it is possible to specify a point in time when the data are entered from the authenticating information added to the data. Since the authenticating information has a high objectivity, the advantage of further improving the probative value of the data as evidence is obtained.

According to another embodiment of the present invention, it is possible to specify a point where the data are entered from the authenticating information added to the data. Since the authenticating information has a high objectivity, the advantage of further improving the probative value of the data as evidence is obtained.

According to another embodiment of the present invention, it is possible to specify the environmental conditions at the point in time of input of the data from the authenticating information added to the data. Since the authenticating information has a high objectivity, the advantage of further improving the probative value of the data as evidence is obtained.

According to another embodiment of the present invention, it is possible to specify the user who entered the data from the authenticating information added to the data. Since the authenticating information has a high objectivity, the advantage of further improving the probative value of the data as evidence is obtained.

According to another embodiment of the present invention, it is possible to specify the unit with which the data was entered from the authenticating information added to the data. Since the authenticating information has a high objectivity, the advantage of further improving the probative value of the data as evidence is obtained.

According to another embodiment of the present invention, it is possible to know whether or not the data have been altered from the authenticating information added to the data. Since the authenticating information has a high objectivity, the advantage of further improving the probative value of the data as evidence is obtained.

According to another embodiment of the present invention, the received data in the authenticating station can be deciphered only by the use of the public key of the information authenticating apparatus which is the transmitting source of the data. When the data can be deciphered, it is known that the data entered by the information authenticating apparatus were really transmitted from that information authenticating apparatus. If the data cannot be deciphered, it is known that the data were not entered from that information authenticating apparatus. Therefore the advantage of further improving the probative value of the data as evidence is obtained.

According to another embodiment of the present invention, on the other hand, a digital signature is not affixed to the data when the authenticating information added to the data is altered or the data are unduly transmitted. It is therefore possible to ensure a higher objectivity of the data as compared with the conventional art, and the advantage of further improving the probative value of the data as evidence is obtained.

According to another embodiment of the present invention, a digital signature is not affixed when the time information added as authenticating information to the data is altered, thus enabling a higher objectivity of the data to be ensured, and the advantage of further improving the probative value of the data as evidence is obtained.

According to another embodiment of the present invention, a digital signature is not affixed to the data when the positional information added as authenticating information to the data is altered, thus enabling a higher objectivity of the data to be ensured, and the advantage of further improving the probative value of the data as evidence is obtained.

According to another embodiment of the present invention, a digital signature is not affixed to the data when the apparatus information added as authenticating information to the data are altered, thus ensuring a higher objectivity, and the advantage of further improving the probative value of the data as evidence is obtained.

According to another embodiment of the present invention, a digital signature is not affixed to the data when the inspection information added as authenticating information to the data or the data themselves are altered, thus ensuring a higher objectivity of the data, and the advantage of further improving the probative value of the data as evidence is obtained.

It will be apparent to those skilled in the art that various modifications and variations can be made in an information authenticating apparatus and an authenticating station performing authentication of data of the present invention without departing from the spirit or scope of the inventions. Thus, it is intended that the present invention cover modifications and variations of this invention that come within the scope of the appended claims and their equivalents.

What is claimed is:

1. An information authenticating apparatus authenticating data by the use of an authenticating station which performs digital signing, comprising:
    data input means for entering data;
    authenticating information adding means for adding authenticating information for authenticating input of the data by the use of said data input means to the data entered by said data input means; and
    transmitting means for transmitting the data containing the authenticating information by said authenticating information adding means to said authenticating station for further authentication of the data, wherein the authenticating station is physically separate from the authenticating apparatus and is connected to the authenticating apparatus only when authenticating data,
    wherein said authenticating information adding means has environmental condition measuring means for measuring a plurality of different surrounding environmental conditions, generates environmental condition information for specifying the plurality of different environmental conditions at the point in time when the data was entered by said data input means on the basis of the plurality of different environmental conditions measured by said environmental condition measuring means, and adds the generated environmental condition information as authenticating information.

2. An information authenticating apparatus according to claim 1, wherein:
said authenticating information adding means has time measuring means for measuring time, generates time information for specifying a point in time when the data were entered by said data input means on the basis of the time measured by said time measuring means, and adds the generated time information as authenticating information.

3. An information authenticating apparatus according to claim 1, wherein:
said authenticating information adding means has position measuring means for measuring a position, generates positional information for specifying a point where the data were entered by said data input means on the basis of the position measured by said position measuring means, and adds the generated positional information as authenticating information.

4. An information authenticating apparatus according to claim 1, wherein:
said authenticating information adding means has environmental condition measuring means for measuring the surrounding environmental conditions, generates environmental condition information for specifying the environmental conditions at the point in time when the data were entered by said data input means on the basis of the environmental conditions measured by said environmental condition measuring means, and adds the generated environmental condition information as authenticating information.

5. An information authenticating apparatus according to claim 1, further comprising:
personal information storing means for storing first personal information; and
personal information input means for entering second personal information;
wherein when the first personal information entered by said personal information input means and the second personal information of said personal information storing means satisfy a prescribed relationship, said authenticating information adding means adds the first personal information of said personal information storing means as authenticating information.

6. An information authenticating apparatus according to claim 1, further comprising:
apparatus information storing means for storing apparatus information intrinsic to said information authenticating apparatus,
wherein said authenticating information adding means adds the apparatus information of said apparatus information storing means as authenticating information.

7. An information authenticating apparatus according to claim 1, wherein:
said authenticating information adding means generates inspection information for inspecting whether or not said data contain an error, by the use of the data entered by said data input means, and adds the generated inspection information as authenticating information.

8. An information authenticating apparatus according to claim 7, wherein:
said authenticating information adding means generates inspection information by means of a hash function using the data entered by said data input means.

9. An information authenticating apparatus according to claim 1, wherein:
said authenticating information adding means encrypts the data containing the added authenticating information.

10. An information authenticating apparatus according to claim 9, wherein:
said encryption is accomplished by the application of a public key encrypting method; and
said authenticating information adding means encrypts the data containing the added authenticating information with a secret key of said information authenticating apparatus.

11. An information authenticating apparatus according to claim 1, further comprising:
receiving means for receiving the data containing the digital signature affixed by said authenticating station from the authenticating station; and
data storing means for storing the data received by said receiving means.

12. An authenticating system comprising:
an information authenticating apparatus that authenticates data having:
data input means for entering data;
authenticating information adding means for adding authenticating information for authenticating input of the data by the use of said data input means to the data entered by said data input means, wherein positional information is added by an information authenticating apparatus-side position measuring means as authenticating information of the data; and
transmitting means for transmitting the data comprising the authenticating information; and
an authenticating station that affixes a digital signature to the data transmitted from the information authenticating apparatus, wherein the authenticating station is physically separate from the authenticating apparatus and is connected to the authenticating apparatus only when authenticating data, the authentication station having:
authenticating station-side receiving means for receiving transmitted data from said information authenticating apparatus; and
digital signature affixing means for affixing a digital signature to the data received by said authenticating station-side receiving means;
wherein when input of the data by said data input means is authenticated, said digital signature affixing means affixes the digital signature to the data received by said authenticating station-side receiving means on the basis of the authenticating information added to the data received by said authenticating station-side receiving means, and
wherein said digital signature affixing means has authenticating station-side position measuring means and when the position specified by the positional information added as authenticating information of the data received by said authenticating station-side receiving means and the position measured by said authenticating station-side position measuring means satisfy a prescribed relationship, affixes the digital signature to the data received by said authenticating station-side receiving means.

13. An authenticating system according to claim 12, wherein:
said digital signature affixing means has authenticating station-side time measuring means for measuring time, and when the time specified by time information added as authenticating information of the data received by said authenticating station-side receiving means and the time measured by said authenticating station-side time measuring means satisfy a prescribed relationship, affixes the digital signature to the data received by said authenticating station-side receiving means.

14. An authenticating system according to claim 12, comprising:
an authenticating station-side apparatus information storing means for storing apparatus information intrinsic to said information authenticating apparatus,
wherein when the apparatus information added as authenticating information of the data received by said authenticating station-side receiving means and the apparatus information of said authenticating station-side apparatus information storing means satisfy a prescribed relationship, said digital signature affixing means affixes the digital signature to the data received by said authenticating station-side receiving means.

15. An authenticating system according to claim 12, wherein:
said digital signature affixing means generates inspection information by the use of the data received by said authenticating station-side receiving means, adds the generated inspection information as authenticating information, and when the generated inspection information and the inspection information added as authenticating information of the data received by said authenticating station-side receiving means satisfy a prescribed relationship, affixes the digital signature to the data received by said authenticating station-side receiving means.

16. An authenticating system according to claim 15, wherein:
said digital signature affixing means generates inspection information with a hash function by the use of the data received by said authenticating station-side receiving means.

17. An authenticating system according to claim 12, wherein:
said authenticating information adding means encrypts the data comprising the added authenticating information; and
said digital signature affixing means deciphers the data received by said authenticating station-side receiving means by a deciphering method corresponding to the encrypting method of the authenticating information adding means.

18. An authenticating system according to claim 17, wherein:
said digital signature affixing means deciphers the data received by said authenticating station-side receiving means by a public key of the information authenticating apparatus serving as the transmitting source of said data.

19. An authenticating system according to claim 12, further comprising:
authenticating station-side transmitting means for transmitting data bearing the digital signature affixed thereto by said digital signature affixing means to said information authenticating apparatus.

20. An authenticating system according to claim 12, further comprising:
authenticating station-side data storing means for storing the data containing the digital signature affixed thereto by said digital signature affixing means.

21. An information authenticating apparatus according to claim 1, wherein:
said data includes at least one of image data, audio and music data, document data, and waveform data.

22. An information authenticating apparatus according to claim 1, wherein:
said environmental condition information includes light intensity, photographic images, and at least one of humidity, temperature, atmospheric pressure, gas concentration, wind velocity, altitude, and sound volume.

23. An information authenticating apparatus according to claim 5, wherein:
said personal information includes at least one of user ID information and password information.

* * * * *